United States Patent [19]

Deneuville et al.

[11] Patent Number: 4,805,524

[45] Date of Patent: Feb. 21, 1989

[54] PROCESS FOR PREPARING ELABORATED FOOD PRODUCTS AND INSTALLATION FOR CARRYING OUT THE PROCESS

[75] Inventors: Claude Deneuville, Villeneuve d'Ascq; Dominique Hondermarck, Marcq en Baroeul, both of France

[73] Assignee: S N C Le Petit Cuisinier, Villeneuve D'Ascq, France

[21] Appl. No.: 37,540

[22] Filed: Apr. 13, 1987

[30] Foreign Application Priority Data

Apr. 14, 1986 [FR] France .................. 86 05294

[51] Int. Cl.$^4$ .................. A23L 1/00; A23L 3/00
[52] U.S. Cl. .................. 99/339; 99/330; 99/331; 99/362; 99/367; 99/470
[58] Field of Search .................. 99/467, 330, 477, 470, 99/478, 339, 443 C, 331, 403, 341, 404, 348, 407, 359, 360, 361, 362, 367, 368, 370, 371, 426, 427, 483; 53/425, 127, 122, 559, 579; 422/25

[56] References Cited

U.S. PATENT DOCUMENTS

| | | | |
|---|---|---|---|
| 2,700,939 | 2/1955 | Liston | 53/122 |
| 3,606,995 | 9/1971 | Van den Hemel | 53/425 |
| 3,662,676 | 5/1972 | Hartz | 99/360 |
| 3,927,976 | 12/1975 | Reimers et al. | 99/361 X |
| 4,234,612 | 11/1980 | Sakakibara et al. | 99/404 |
| 4,505,192 | 3/1985 | Dreano | 99/367 |
| 4,707,334 | 11/1987 | Gerhard | 53/425 |
| 4,719,849 | 1/1988 | Cope et al. | 99/404 |

Primary Examiner—Timothy F. Simone
Attorney, Agent, or Firm—Fisher, Christen & Sabol

[57] ABSTRACT

This invention relates to a process and installation for preparing elaborated food products and to the food products of the "cooked dish" type obtained thereby, said food products being elaborated from two lines of preparation, namely a first line for pre-cooking the solid products by passage in a bath of alimentary liquids, a second line for pre-cooking an aromatic phase in the substantially liquid state in vats with programmable temperature, stirring and supply, the solid products coming from the first line and the liquid aromatic phase coming from the second line being combined in a packing line supplying individual containers which, after being placed in vacuo, are closed and subjected individually to a final cooking phase in a cooker unit by pouring thereover a heating liquid, particularly water, at a temperature lower than 100° followed by rapid cooling. The invention makes it possible to obtain fresh cooked dishes adapted to be conserved at a temperature of the order of 3° C. for several weeks.

7 Claims, 2 Drawing Sheets

4,805,524

PROCESS FOR PREPARING ELABORATED FOOD PRODUCTS AND INSTALLATION FOR CARRYING OUT THE PROCESS

BACKGROUND OF THE INVENTION

The present invention relates to a novel process for preparing elaborated food products of the "cooked dish" type, as well as to an installation for carrying out the process.

BROAD DESCRIPTION OF THE INVENTION

The invention generally concerns the food industry and more particularly the preparation of cooked dishes packed in units of consumption and constituted by a main component (such as meat, fish, eggs, vegetables) embellished by a second component, constituting a sauce.

It is a first object of the invention to produce dishes packed in a light pack, for example a sachet of synthetic material, the product in this packing being conservable for a limited duration, extending over several weeks, at a "positive cold" temperature, i.e. included between 1° and 5° C. and preferably around 3° C.

The invention makes it possible to prepare food products of high quality, particularly from the standpoint of freshness, both for everyday, ordinary dishes and for elaborate, gastronomic dishes.

To this end, the invention relates to a process for preparing elaborated food products ready for consumption, of the "cooked dish" type and constituted on the one hand by at least one main solid food component (such as meat, fish, eggs, vegetables) and on the other hand an accompanying sauce in a substantially liquid state, packed in a hermetic envelope, particularly a welded sachet of synthetic material, said food products being adapted to be conserved for several weeks at a temperature included between 1° and 5° C., characterized by the following steps of:

(a) preparing on a first production line the solid components (such as meat, fish or vegetables) previously cut up into portions and subjecting these portions to a superficial precooking phases by passage in an alimentary fluid phase at appropriate temperature, (b) preparing on a second production line constituted by at least one recipient a liquid aromatic phase, by mixture and appropriate precooking of the ingredients constitiuting the final accompanying sauce, (c) transferring in a packing line the portions of solid component in containers, in particular made of synthetic material and conveyed continuously, (d) transferring in said packing line and by automatic handling means and protected from air, from the preparation recipients of the second line of production, the liquid aromatic phase which is poured on leaving its precooking phase in doses into each container, each individual container thus successively receiving the solid food component and the dose of the liquid aromatic phase, both in the precooked state, (e) closing the containers by heat-sealing after placing the volume constituted by each container in vacuo, (f) introducing the hermetically closed containers into a cooking enclosure where they are maintained in an appropriate thermal cycle, ensuring overall and synergetic cooking of the combined component elements both introduced in the precooked state, overall cooking in vacuo of the combined components allowing interpenetration and enhancement of the organoleptic principles of the various components;

(g) at the end of cooking, storing the containers at a temperature included between 0° and 10° C. and preferably between 1° and 3° C., for a period of several weeks.

The invention also relates to an installation for carrying out the process, characterized in that it comprises:

(a) a line for preparing the solid products such as meat or fish and comprising at least one enclosure adapted to contain an alimentary fluid associated with controlled, programmable heating means, means for circulating and conveying the products in the enclosure from an admission station towards an exit station and constituted in particular by an endless conveyor belt formed by a metal grid and associated with means for programming and controlling the speed of advance of the belt, (b) a second line for preparing liquid aromatic phases, constituted by at least one vat provided with programmable heat regulation means as well as programmable, internal stirring means, the internal volume of the vats being connected by fluid circulation means to sources of storage of alimentary liquids such as water, wine, as well as to sources of liquid detergent and rinsing products, and to sources of gas such as compressed air, neutral gas, steam.

Finally, the invention relates to a food product constituting a cooked dish ready for consumption by simple reheating and packed in a hermetic envelope constituted in particular by a welded sachet of synthetic material and adapted to be conserved for several weeks at a temperature of between 0° and 5° C., the cooked dish comprising a solid principal food component such as meat, fish, eggs, vegetables and an accompanying sauce substantially in the liquid state, said food product being characterized in that it was made by separately preparing, on the one hand, the solid component subjected to a superficial pre-cooking phase by passage in a bath of alimentary fluid, and on the other hand a liquid aromatic phase by mixture and appropriate pre-cooking of the ingredients contained in the final accompanying sauce, the two components (solid components on the one hand and liquid aromatic phase on the other hand) being combined in a container by pouring the liquid aromatic phase from the closed recipient for preparing it, the liquid phase having automatically passed through a circulation circuit up to the pouring station, the container combining the ingredients having been enclosed in vacuo and subjected to an overall cooking of the component elements in a cooking enclosure, allowing interpenetration and enhancement of the organoleptic principles contained in each of the phases.

BRIEF DESCRIPTION OF THE INVENTION

The invention will be more readily understood on reading the following description with reference to the accompanying drawings, in which.

DETAILED DESCRIPTION OF THE INVENTION

Figure 1:
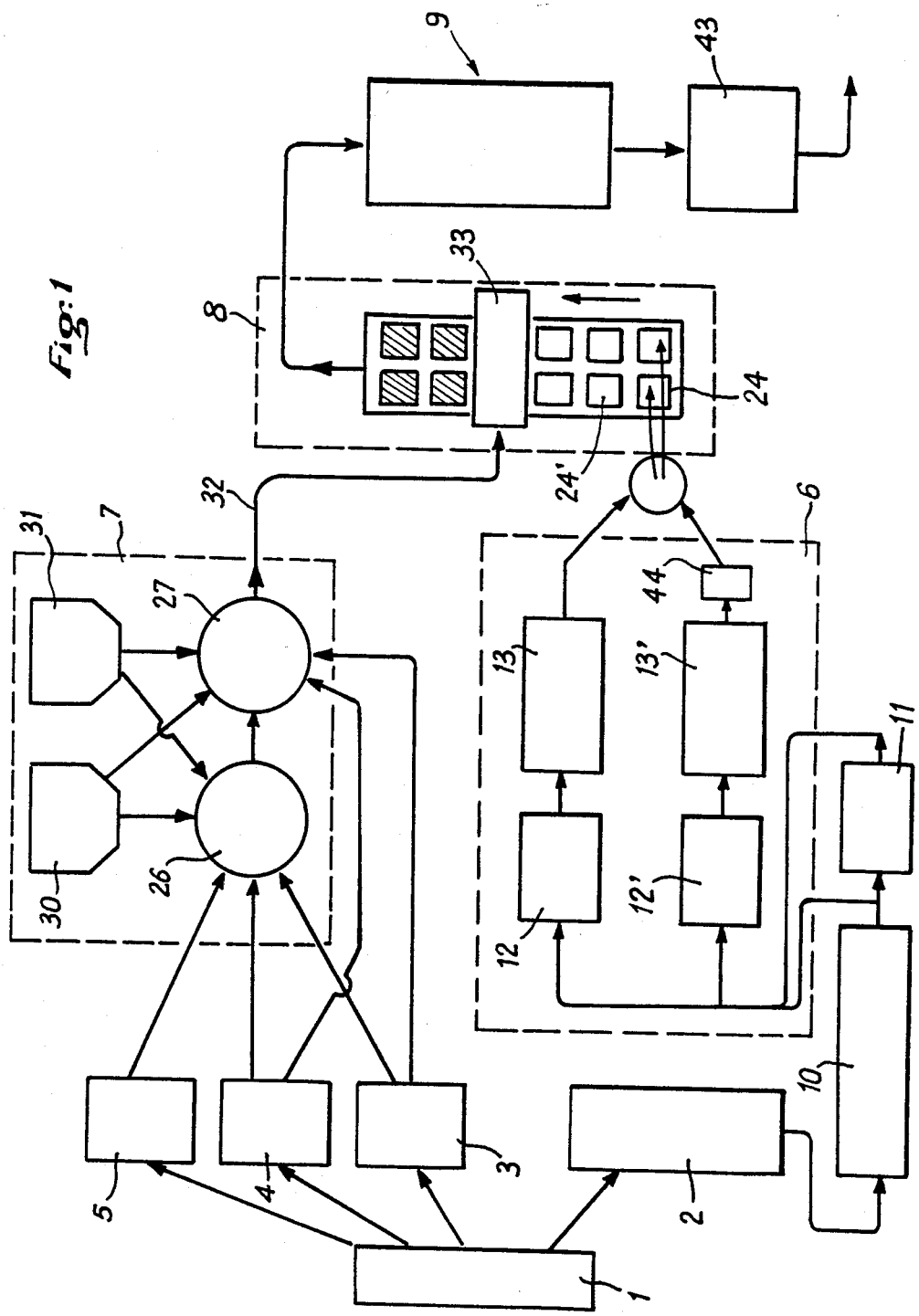
FIG. 1 shows a general diagram of the different functions and steps within the framework of the process according to the invention.

Referring now to the drawings, FIG. 1 shows that the basic components or raw materials conducted to the admission station 1 of the processing room, are sorted and distributed towards separate storage enclosures as a function of their characteristics.

For example, from the admission station 1, the products that necessitate cold-storage (meat, fish, etc.) are conducted towards the cold chamber 2 maintained at an appropriate temperature; the dairy products are conducted towards an enclosure 3 maintained at a temperature of the order of 5° to 8° C.; the grocery products (preserved vegetables and condiments) are stored in enclosure 4 at ambient temperature, whilst the spices are conducted to specific reservoir 5. Certain products may be delivered refrigerated (+3° C.) and pass directly for preparation in room 11.

According to the invention and as shown in FIG. 1, the process employs two separate lines for preparation, namely a first line of preparation (represented by the broken-line frame 6 in FIG. 1) intended for pre-cooking the solid components, and a second line of preparation (shown schematically by the broken-line frame 7 in FIG. 1) for precooking a liquid aromatic phase; the two lines of preparation join each other on a single packing line (shown schematically by the broken-line frame 8 in FIG. 1), terminating at the cooking phase 9.

The solid products supplying the line of preparation 6 are generally constituted by meat products, particularly pieces of meat or fish supplied from the storage area or cold chamber 2.

Previously, the products (if they were stored in the frozen state) pass into a micro-wave thawing tunnel 10 followed by a phase of preparation in the specialized room 11 where the products are finally unpacked, calibrated, seasoned, weighed and controlled, placed in recipients and left to stand at a temperature of the order of 3° C. for a period of some hours in order to allow re-adaptation of the products to a positive temperature.

The products leaving the rest chamber 11 in recipients are conducted, in order to undergo precooking in line 6, towards preparation tables 12, 12'.

Table 12 is used for the preparation, before pre-cooking, of the meat intended to be braised in the bath of oil 13 or in an enclosure containing a gaseous fluid at appropriate temperature.

The chain corresponding to table 12' and to bath 13' supplied with water close to boiling temperature is used for scalding the surface of products such as fish, white meat, etc.

Whether it be in gaseous phase, or in oil for browning or in water for scalding, the principal object of this pre-cooking phase is to obtain an outer cauterization of the solid food, which will avoid desiccation of this food by excessive production of exudate during final cooking.

The solid foods which have been poached in water are subjected on leaving the vat to a washing phase by running water in order to clean them of the residual impurities, particularly scum, in a washing/rinsing station 44.

Figure 2:
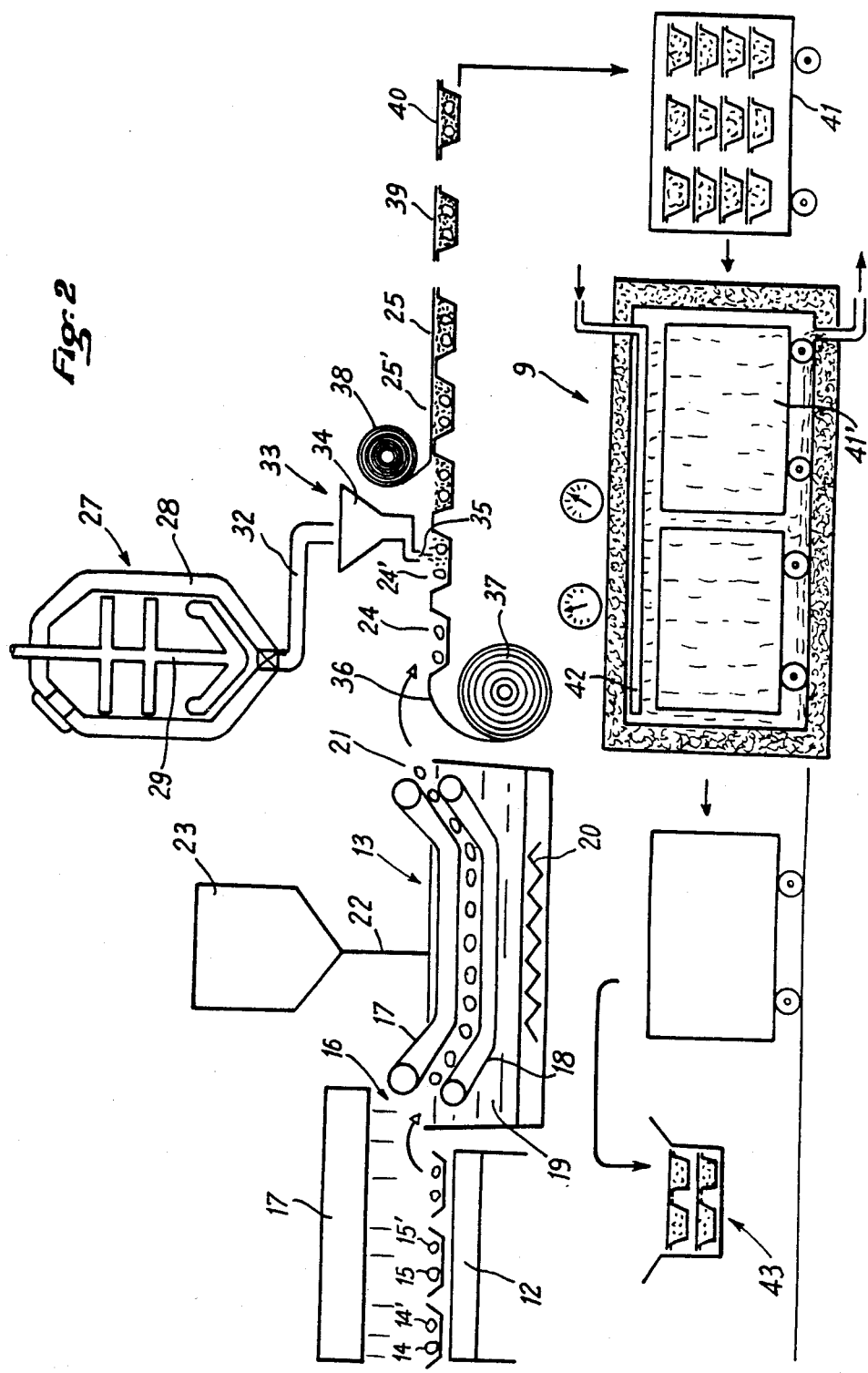
FIG. 2 shows a schematic diagram illustrating an embodiment of the installation according to the invention.

FIG. 2 shows a schematic illustration of an embodiment of the installation and it shows that the preparation table 12 receives individual pieces of meat 14, 14, 15, 15' in recipients disposed opposite the admission station 16 of the braising tank 13.

The solid products thus exposed on tables 12, 12' are protected from any contamination by a laminary flow of sterile air diffused from upper element 17.

The meat products, i.e. pieces of meat, are continuously supplied towards the conveyor formed by one or possibly two belts 18, 18' passing through the bath of oil 19 maintained at appropriate temperature by heating means 20 subjected to a regulation for strict control of the temperature; the bath of oil may be replaced by a gaseous phase (air, neutral gas or water vapour) at high temperature (100° to 200° C.).

The speed of advance of the or each conveyor is also strictly controlled as a function of the temperature so as to allow the effect of braising and browning by surface cauterization of the pieces of meat which are continuously supplied thus to the exit station 21.

According to a particular feature of the installation, the bath of oil 19 is connected by pipe 22 (provided with pump and filtration means which have not been shown), to the storage tank 23.

It is thus possible, during periods of non-use, to empty bath 13 to re-introduce the oil into the closed enclosure 23 where it is protected from outside sources of oxidation.

The braised meat products (or poached fish or white meat) delivered individually to the exit station 21 may then be conducted towards the packing line 8 (FIG. 1), where they will be combined in individual containers 24, 24', 25, 25', with the liquid aromatic phase prepared on the second line 7. Station 8 may be equipped with an element for diffusing a laminary flow of sterile air, similar to the one provided above tables 12, 12'.

Line 7 is used for preparing a liquid aromatic phase comprising the ingredients which, after final cooking in phase 9, will reconstitute the accompanying sauce present in the finished cooked dish.

The object of phase 7 is therefore not to prepare a final sauce, but an aromatic condimentary base in the liquid or substantially liquid state and which, after incorporation thereof in the ensemble containing the solid product, and after final cooking, will constitute the characteristic sauce of the cooked dish.

According to the invention, this liquid aromatic phase is prepared under automatic conditions ensuring perfectly aseptic preparation.

To this end, the invention employs a robotized assembly constituted by at least one and preferably a plurality, for example two in the case of FIG. 1, of preparation vats 26 and 27 respectively.

Each vat is associated with heating means, for example in the form of a heating jacket 28 (FIG. 2) and with stirring means constituted by one and preferably more internal stirrers, particularly with opposite directions of rotation; at least one of these stirrers is provided with scraping means constituted by flexible blades abutting on the inner wall of the vat. The or each stirrer (referenced 29 in FIG. 2) is driven from an upper gear motor (not shown).

Each of the vats 26 or 27 is connected by fluid or fluidizable product transfer circuits to storage vats or hoppers 30, 30' respectively containing for example alimentary fluids such as oil, water, wine, milk, cream, etc. or possibly powders which may be conducted by pneumatic means. Each vat may also be connected (by conduits provided with electro-valves) to a source of vacuum and/or sources of appropriate gases (such as pressurized air, nitrogen, water vapour) for cooking under pressure or in a controlled atmosphere or pneumatic evacuation; each vat is also connected to sources of detergent, bactericidal cleaning fluids adapted to be conveyed in all the conduits of the installation after the food products have been evacuated.

The solid aromatic condimentary ingredients which are stored in chambers 3, 4, 5 may be conducted (preferably in hermetic containers) in dosed quantities from these chambers towards the aromatic preparation line or station 7.

According to a feature of the invention, the use of a plurality of vats allows the separate preparation of the various ingredients included in the composition of the liquid aromatic phase.

In a first vat, the aromatic vegetable products such as garlic, onions, shallots, mushrooms, may for example by reduced in a medium and at a temperature in accordance with the rules of the culinary art; in another vat, the sauce stocks may be prepared from powder products, particularly compositions incorporating binding agents, flavours, spices.

These separately prepared phases may be combined in a final pre-cooking vat with incorporation of the alimentary liquids such as water, oil, wine or the like, as a function of the specific recipes.

Vats 26 and 27 may therefore follow a cycle of preparation with temperature, speed and rhythm of stirring in accordance with a determined programme corresponding to each recipe of which the rules and standards are set in advance.

Under these conditions, human intervention is totally excluded, since the liquids and possibly the powders (for example in fluidized bed) may be conducted directly from the storage reservoirs towards the appropriate preparation vat; supply and flowrate of these products, particularly the liquid products, may be programmed and do not require human intervention, and there is no passage in the open air; the same applies to the mixture of the ingredients prepared separately which may pass from one vat to the other by the transfer means, particularly the conduits which join the vats to one another.

In this way, the sauces are prepared under totally aseptic conditions, the healthy products introduced furthermore being subjected to a heat cycle pasteurizing the products; and the liquid aromatic phase thus prepared and in its pasteurized state is protected from any interference and any manipulation, and particularly from any passage in the open air.

Particularly when the final step is terminated, the liquid aromatic phase may be conducted via conduit 32 up to the pouring station 33 towards the containers 24, 24' already containing the solid products.

Under these conditions, the pasteurized liquid aromatic phase arrives at station 33 in the packing line 8, immediately before closure and seal of the containers, thus avoiding any passage and any interference likely to recontaminate the sensitive products constituted by the liquid aromatic phase intended to constitute the sauce of the dish during final cooking.

The individual containers 24, 24' are obtained, in manner known per se, in a packing assembly, from the deformation of a film 36 unwound from reel 37, the film 36 constituting recesses defining the individual containers; into these latter are placed, manually or automatically, the solid products coming from the pre-cooking line 6 in the desired number of pieces or portions as a function of the nature of the dish or the quantity to be packed in each container; the assembly 33 for pouring the liquid aromatic phase comprises an upper hopper 34 in which is poured, from conduit 32, the liquid phase coming from the robotized preparation vat 27, and at the base of the hopper 34 is located the dosing device with spout 35 so that each container receives the appropriate quantity of aromatic liquid.

Immediately afterwards, all the containers, conveyed continuously or step by step, are sealed by welding on the edges and transversely, the lower film 36 and the upper film unwound from reel 38 at the same time (and in manner known per se), and the interior of the container is placed in vacuo; the recesses are then separated to produce individual containers 39, 40.

These latter are positioned on trays inside a trolley 41 conducted towards the final cooking enclosure 9.

The cooking enclosure is constituted by a cooking unit adapted to receive the trolleys 41, 41'.

The cooking unit adapted to be closed hermetically, possibly under pressure, after the trolleys have been positioned therein, makes it possible to follow a heat cycle in accordance with a desired programme.

In the embodiment described here, the transmission of the calories is effected in liquid phase by sprinkling, from ramp 42, a heat-conveying liquid, for example water, taken to an appropriate temperature from a supply source (not shown); the water collected at the base of the box element is recycled after passage over the reheating means.

The cooking unit is associated with data-processing programmation means, particularly a micro-processor incorporated in a programming and display table or console for programming and visually monitoring the cooking cycle (i.e. the evolution of the temperature as a function of time), programmation thus making it possible to adapt cooking to each recipe or preparation composing the charge during cooking.

Furthermore, the cycle effectively followed is recorded and the data are stored for each batch at the same time as the data corresponding to the parameters of preparation of the earlier phases, particularly surfaces pre-cooking of the solid products in the first line of preparation 6 or pre-cooking of the liquid aromatic phase in the second line of preparation 7, are conserved and stored.

The spray ramp 42 inside the cooker unit is also connected to a second source of heat-conveying fluid at low temperature for example iced water.

At the end of the cooking cycle, the ramp 42 pours this water to obtain rapid and immediate cooling of the products to the conservation temperature of 3° C.; pouring of the iced water continues until the heart of the products has attained this temperature. The trolleys may then be removed from the cooker unit the cooking cycle being terminated, the containers are removed to be packed and/or regrouped in packings at wrapping station 43 and the products may then be stored, distributed, conveyed without having to be maintained under the strict conditions of temperature required for deep-frozen products, the conservation temperature being a temperature corresponding to positive cold, i.e. at a temperature of between 1° and 5° C., and preferably 3° C.

The products thus produced may be conserved under perfect conditions both from the bacteriological point of view and from the standpoint of the organoleptic and taste qualities up to the phase of consumption (after simple reheating), for a period of several weeks; reheating may be obtained by passage in a water-bath or by exposure in vapour phase or exposure in a micro-wave oven.

What is claimed is:

1. Installation for preparing elaborated food products ready for consumption, of the cooked dish type, said food products comprising at least one main solid food component, and an accompanying sauce in a substantially liquid state, the solid food component and the sauce being packed together in a hermetically welded sachet of synthetic material, said food product being thus adapted to be preserved for several weeks at a temperature of between 1° and 5° C., said installation being constituted by enclosures for storing the food components, enclosures for cooking said food, packing means for packaging into individual containers and transfer means for conveying the food, wherein said installation further comprises:
   (a) a first pre-cooking line for preparing the solid products and incorporating:
     at least one enclosure,
     an alimentary fluid contained in said enclosure;
     programmable heating means to heat said alimentary fluid;
     an admission station and an exit station in said enclosure;
     an endless conveyor belt to move said solid products from the admission station to the exit station;
     means for controlling the advance of the belt;
   (b) a second pre-cooking line for preparing liquid aromatic phases incorporating:
     a least one vat;
     programmable heating means;
     programmable internal stirring and scraping means;
     sources of supply of alimentary liquids;
     transfer circuits to convey said liquid from said sources to said vat;
   (c) a packing station incorporating:
     a plurality of containers, each adapted to receive at least one solid food product;
     at least one reel of film adapted to be deformed to constitute said containers;
     at least one hopper adapted to receive said aromatic liquid phase;
     a spout at the base of said hopper;
     a device for automatically dosing and pouring said liquid aromatic phase into the containers;
   (d) transfer means incorporating:
     a circulation conduit connecting at least one vat for preparing the liquid aromatic phase to the said hopper in the packing station;
   (e) welding means to close and seal said containers containing said pre-cooked food;
   (f) cooking means incorporating:
     a cooking enclosure adapted to receive the containers containing the solid food products and the liquid aromatic phase;
     a source of heating liquid;
     a source of cooling liquid maintained at a temperature of between 0° and 5° C.;
     means for pouring said heating liquid and cooling liquid;
     data-processing programming means adapted to control supply of the heating or cooling liquid from said pouring means.

2. The installation of claim 1 wherein said first line for preparing the solid products comprises two vats, of which a first vat is adapted to contain a bath of oil and said vat comprises heating means to take said oil to an appropriate temperature, conveying means to circulate solid food products inside said oil in a hot state so that said solid food products are subjected to a grilling and surface browning phase, a closed enclosure for storing the oil when not in use, fluid circulation and filtration means to transfer said oil from said storage enclosure to said vat.

3. The installation of claim 1 wherein the first line for preparing the solid food products comprises two vats of which a second vat is adapted to contain water, and said vat further comprises heating means to take said water up to a temperature close to boiling point, conveying means to circulate solid food products inside said water, said conveying means including an upper belt and a lower belt driven in a synchronous advance movement to imprison and maintain the solid food products in the hot water to produce a poaching effect.

4. The installation of claim 1 wherein the second line for preparing a liquid aromatic phase comprises:
   a plurality of vats,
   programmable means for heating, stirring and scraping the said vats;
   sources for supplying food products in a liquid or powdery state;
   sources for supplying washing and rinsing liquids;
   sources of gas;
   a plurality of transfer circuits for fluid or fluidized products, said circuits connecting one vat to said sources;
   a plurality of valves and pumps to ensure transfer of the fluid or fluidized products from said sources to one vat;
   data-processing and remote-control means for displaying and remotely controlling the circulation of said fluid or fluidized products;
   means for recording temperature, pressure, speed of stirring, and dosing of the products introduced in the corresponding vats.

5. The installation of claim 1 wherein it further comprises a line for preparing the solid components, said line incorporating at least one table and one upper assembly to diffuse a laminary flow of sterile air over said table, thus protecting the products placed on said table from any contamination.

6. The installation of claim 1 wherein said at least one main solid food component is meat, fish, eggs, or vegetables, wherein said alimentary liquids are water, wine or milk.

7. The installation of claim 4 wherein said source of gas is air, a neutral gas or steam.

* * * * *